United States Patent [19]

Sutton, Jr.

[11] 4,113,175

[45] Sep. 12, 1978

[54] VENTILATION SYSTEM FOR POULTRY OR LIVESTOCK HOUSE

[76] Inventor: James Alton Sutton, Jr., 1545 Shelton Ave., Statesville, N.C. 28677

[21] Appl. No.: 716,158

[22] Filed: Aug. 20, 1976

[51] Int. Cl.² .......................................... G05D 123/00
[52] U.S. Cl. ..................... 236/46 A; 98/1.5; 98/33 R; 236/49
[58] Field of Search ............... 98/1.5, 33 R, 41 SV, 98/41 R; 236/49, 46 A; 119/21; 318/447, 484

[56] References Cited

U.S. PATENT DOCUMENTS

| | | | |
|---|---|---|---|
| 3,294,151 | 12/1966 | Hartley et al. | 318/447 X |
| 3,429,298 | 2/1969 | Thomason | 119/21 |
| 3,611,906 | 10/1971 | Corenz | 236/49 X |
| 3,741,101 | 6/1973 | Sheppard | 98/86 |
| 3,830,146 | 8/1974 | Kaiser | 98/41 SV |
| 3,938,428 | 2/1976 | Van Huis | 98/1.5 |
| 3,951,336 | 4/1976 | Miller et al. | 98/1.5 |
| 3,973,173 | 8/1976 | Smith | 119/21 X |

Primary Examiner—William E. Wayner
Assistant Examiner—William E. Tapolcai, Jr.
Attorney, Agent, or Firm—Bell, Seltzer, Park & Gibson

[57] ABSTRACT

A ventilation method and system for automatically repositioning the adjustable closures in a confinement house of the type used for rearing poultry or livestock. A pressure sensor measures the pressure differential between the inside and outside of the house resulting from the operation of one or more exhaust fans, and the adjustable closures are repositioned accordingly by a control device so that the fresh outside air drawn into the house through the ventilation openings enters at an optimum velocity for most effective ventilation of all areas of the house.

17 Claims, 6 Drawing Figures

VENTILATION SYSTEM FOR POULTRY OR LIVESTOCK HOUSE

Confinement houses of the type employed for rearing poultry or livestock conventionally have large ventilating openings in the walls thereof with adjustable closures, such as flexible curtains, associated therewith for varying the effective size of the ventilation openings to allow for control over the ventilation of the house.

In many of the confinement houses of this type, exhaust fans are provided for exhausting humid and contaminated air from the house and causing fresh outside air to be drawn in through the ventilating openings. In accordance with one conventional arrangement, the house has several exhaust fans, some of which operate intermittently under control of a cycle timer under normal temperature conditions to supply the minimum ventilation requirements to the house. Other fans in the house are thermostatically controlled and are set to come into continuous operation as the temperature increases in the house to supply additional ventilation as required.

Another less common arrangement employs one or more continuously operating variable speed exhaust fans which are adapted to increase in speed as the ventilation requirements in the house increase. However, the use of intermittently operating fans of the type previously described for providing the minimum ventilation requirements in the house is generally preferred over continuously operating fans since (1) the intermittently operating fans do not provide a constant draft throughout the house, (2) the intermittently operating fans allow fresh air to be brought into the house and to remain there for a period of time to absorb the ambient moisture, and (3) intermittently operating fans are normally of a higher capacity than continuous fans to allow the air to be brought in at a higher velocity for better mixing.

In confinement houses of the types described above where exhaust fans are employed for ventilation, it is important that the adjustable closures be properly adjusted so that the fresh air drawn into the house by the exhaust fans enters with enough velocity to reach all areas of the house. Otherwise, certain areas of the house may not be adequately ventilated. However, excessive air velocities are to be avoided since the drafts created thereby are undesirable. Also, if the adjustable closures are not sufficiently open, the exhaust fans operate inefficiently and may become overloaded or damaged.

For these reasons, it is generally necessary that the adjustable closures in the confinement house be adjusted several times during the day as the temperature in the house increases and the fan or fans increase the level of ventilation. If the closures are manually adjusted, then it is necessary for someone to pay constant attention to the temperature conditions in the house so that proper ventilation conditions are maintained.

In Kaiser U.S. Pat. No. 3,830,146 a control system is disclosed for automatically adjusting the closures in a poultry or livestock house in response to the pressure difference created by the operation of exhaust fans. However, the system disclosed in this patent employs a specialized type of adjustable closure which is not widely used in many conventional poultry and livestock houses. For this reason, the system disclosed is not suited for being adapted to previously existing houses having various kinds of adjustable closures, such as flexible curtain-type closures, for example.

Also, the system is not suited for use in houses where the exhaust fans operate intermittently under control of a cycle timer. This is because the control system of the Kaiser patent attempts to maintain a uniform static pressure at all times by adjusting the closures open or closed as the pressure differential changes. If employed in a house where the exhaust fan operates intermittently, the system would cause the closures to be closed each time the fan stops in attempting to maintain a uniform pressure differential.

With the foregoing in mind, it is a primary object of this invention to provide a system and method of ventilation which is readily adaptable for use in most conventional poultry and livestock houses and which insures effective ventilation to all areas of the house.

Another object of the invention is to provide a ventilation system and method of ventilation for use in poultry and livestock houses of the type having large ventilation openings in the walls thereof, adjustable closures for adjusting the effective size of the ventilation openings, and exhaust fan means operable to establish a pressure differential between the inside and outside of the house for drawing a flow of fresh air into the house through the ventilation openings; and wherein the ventilation system operates to automatically adjust the closures in accordance with the pressure differential achieved by the exhaust fan means so as to maintain the velocity of the air drawn into the confinement house through the ventilation openings at an optimum level for effective ventilation of all areas of the house.

More specifically, it is an object of the invention to provide a ventilation system and method of the type described in which the closures are automatically adjusted to a more closed position in response to the failure of the exhaust fan means in achieving a predetermined minimum acceptable pressure differential during a predetermined interval of time. The intermittent operation of the exhaust fan means is taken into account in accordance with the present invention, as the adjustable closures are adjusted only in response to the failure of the predetermined minimum acceptable pressure differential being achieved as a result of operation of the exhaust fan means, and not as the result of the lack of a pressure differential when the exhaust fan means is not operating. This insures that the closures are not readjusted every time the exhaust fan ceases operation in its intermittent operation under control of the cycle timer. So long as the minimum acceptable pressure differential is achieved at least once during each cycle of operation of the exhaust fan, then the adjustable closures are not repositioned.

The ventilation system in accordance with the present invention includes exhaust fan means operable to establish a pressure differential between the inside and outside of the confinement house for drawing a flow of fresh air into the house through the ventilation openings, a drive mechanism connected to the adjustable closures of the confinement house for adjustably positioning the same, and a closure control device for controlling the positioning of the adjustable closures by the drive mechanism in accordance with the pressure differential achieved by the exhaust fan means so as to maintain the velocity of the air drawn into the confinement house through the ventilation openings at an optimum level for effective ventilation of all areas of the house. The closure control device includes means for sensing the differential in pressure between the inside and outside of the confinement house, means associated with the sensing means for determining whether a predetermined minimum acceptable pressure differential is sensed at any time during each of a succession of measurement periods, and means associated with the drive mechanism and operable in response to the failure of the minimum acceptable pressure differential being sensed during any such measurement for effecting adjustment of the closures to a more closed position to thereby bring about an increase in the pressure differential and a resulting increase in the air velocity drawn into the confinement house.

Some of the objects and advantages of the invention having been stated, others will appear as the description proceeds, when taken in connection with the accompanying drawings, in which —

Figure 1:
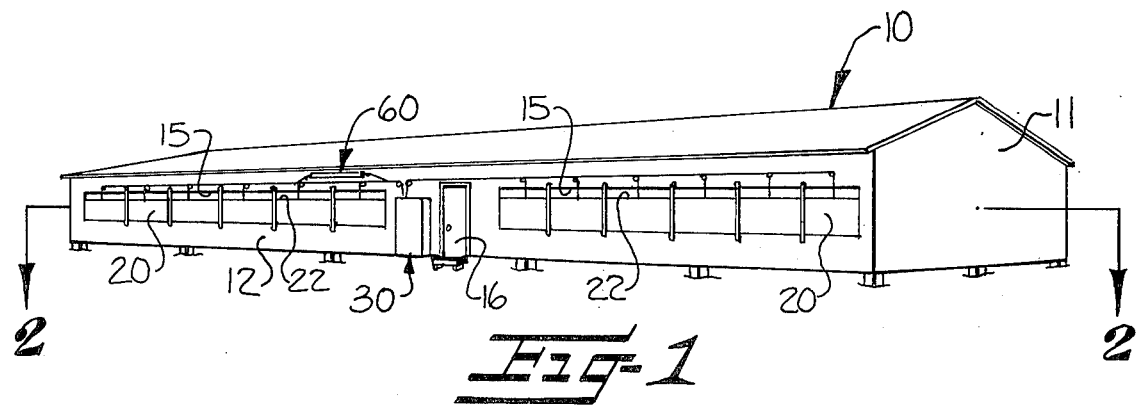
FIG. 1 is a perspective view of a poultry or livestock confinement house having a ventilation control system in accordance with the present invention.
Figure 2:
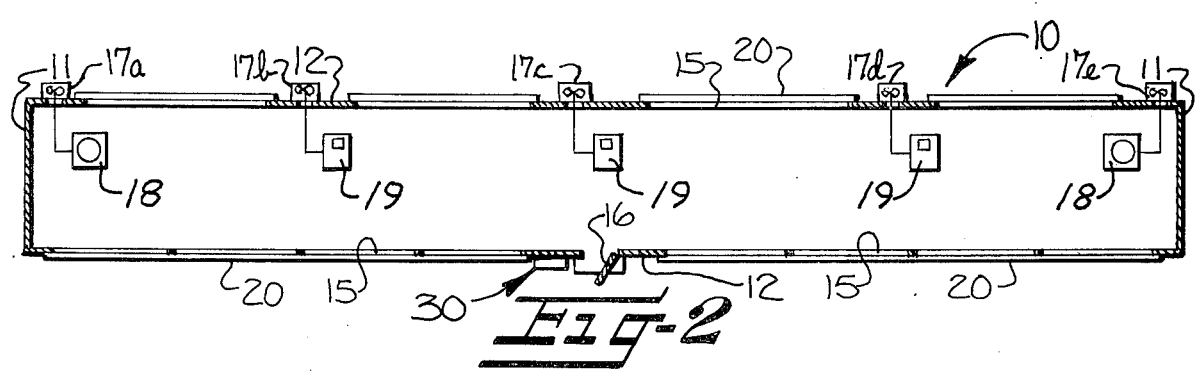
FIG. 2 is a sectional plan view of the confinement house showing the ventilation openings provided along opposite walls thereof and the adjustable closures associated therewith, and showing the ventilation fans provided along one of the walls of the house.

Referring now more particularly to the drawings, a confinement house of the type conventionally used for rearing poultry or livestock is indicated generally in FIGS. 1 and 2 by the reference character 10, and includes end walls 11 and opposing elongate side walls 12, all formed of a suitable siding material such as wood paneling, clapboard, or metal siding. Each of the side walls 12 includes upper and lower enclosed portions with an opening 15 located between the upper and lower enclosed portions for ventilation of the house. The opening 15 is preferably covered by poultry wire or other suitable screening. A door 16 is provided in one side wall of the house and a series of spaced-apart ventilating fans 17a-17e is provided along the opposite one side wall of the house for providing forced ventilation in the house by exhausting air from within the house. The ventilation openings 15 are located between the fans on this side of the house, as well as along substantially the entire length of the opposite side of the house on both sides of the door. The ventilation openings on each side of the house are provided with adjustable closures in the form of flexible curtains 20 which provide for varying the effective size of the ventilation openings, or for completely closing the openings as needed.

The flexible curtains 20 are secured along the lower edge of the ventilation openings 15 and may be raised by cables 21 connected to the upper edge 22 of the curtain so as to cover the screened opening 15 and obstruct the flow of air therethrough. Preferably, as illustrated, a pocket is formed in the hem along the upper edge 22 of the curtains 20 and a rod is positioned therein for providing rigidity to the upper edge of the curtains.

While flexible curtains are the most commonly used type of closures in confinement houses of the type described, other types of closures such as sliding window panels for example, are also employed in some regions, and may also be controlled by the ventilation control system of the present invention.

In the confinement house illustrated, the curtains 20 located along the side wall of the house adjacent to the fans are manually operated in a conventional manner, such as by a winch and cable system similar to that shown in applicant's prior U.S. Pat. No. 3,915,377. These curtains are normally maintained in the closed position when the fans are used for ventilation so that fresh air is drawn into the house through the openings in the opposite side wall of the house.

The flexible curtains along the wall of the house opposite the fans are adjusted automatically by the ventilation control system of this invention so as to maintain optimum ventilation conditions within the house.

Figure 3:
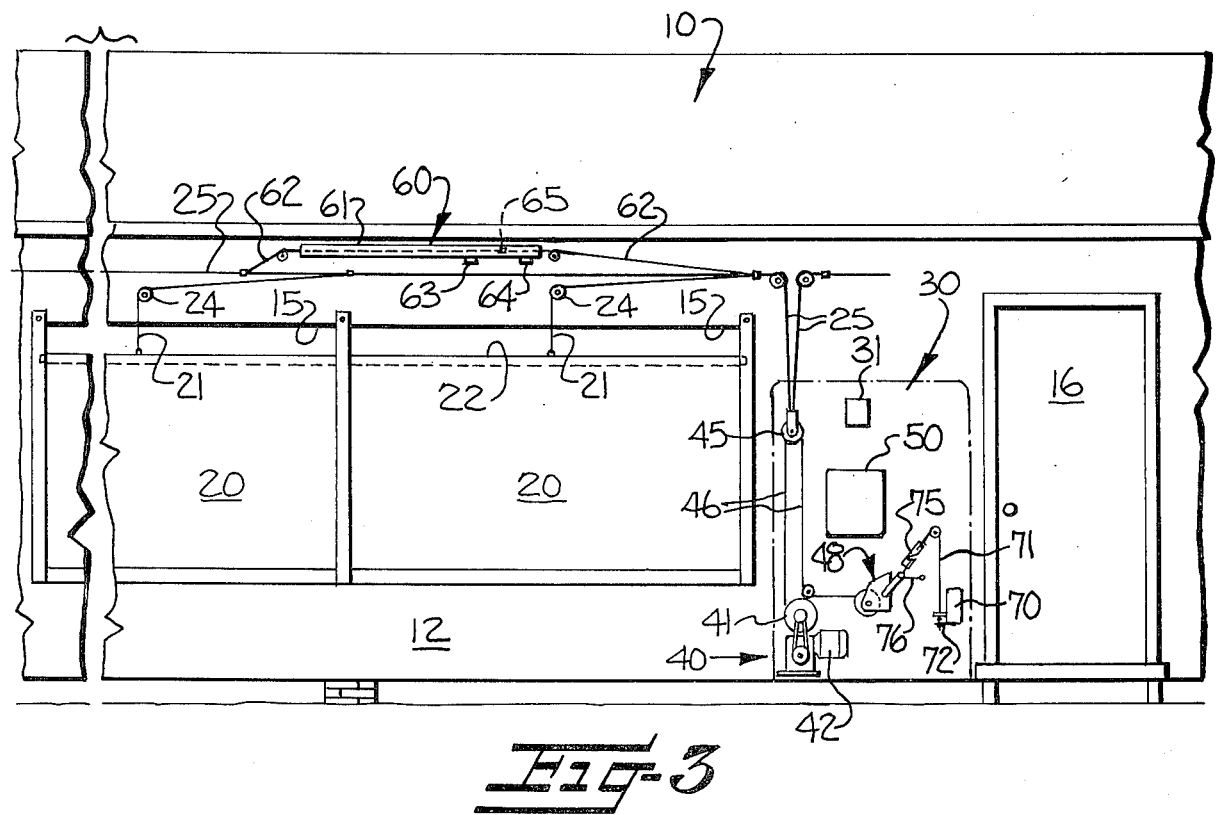
FIG. 3 is a detailed fragmentary elevational view of the house showing some of the components of the ventilation system in greater detail.

Referring to FIG. 3, the cables 21 attached to the upper edge of the curtains are arranged to pass over suitably positioned pulleys 24 mounted on the side wall, and are attached to a main cable 25 which extends substantially the entire length of the building. By reeling in or letting out of main cable 25, the ventilation control system may simultaneously adjust all of the curtains along the side of the house.

As is conventional in confinement houses of the type described, certain of the fans in the house are operated intermittently under control of a cycle timer to provide the minimum ventilation requirements for the house. More particularly, referring to FIG. 2, fans 17a and 17e at opposite ends of the house are controlled by a conventional cycle timer, 18, to operate for 1 to 2 minutes every 10 minutes. The remaining fans, 17b, 17c and 17d are controlled by thermostats 19 and are adapted to come into operation as the temperature in the house increases to thereby provide additional levels of ventilation in the house. Normally, the thermostatically controlled fans are staged to come into operation successively as the temperature within the house increases. For example, the thermostats may be set at 76°, 78° and 80° respectively. The cycle timer controlled fans 17a and 17e may also be controlled by a thermostat which overrides the cycle timer when a predetermined temperature condition occurs. Normally, the thermostats for the timer-controlled fans would have the highest temperature setting so that these fans will be brought into continuous operation only after the remaining thermostatically controlled fans are all in operation.

During the course of a day as the temperature conditions within the house vary, the number of fans in operation varies. In order to maintain effective ventilation to all areas of the house, it is desirable to adjust the position of the closures along the wall opposite the fans in accordance with the number of fans in operation so that the air drawn in through the openings will have an optimum entering velocity. If the curtains are opened too widely, the entering air will have insufficient velocity to reach all areas of the house and mix with the stale air present therein. On the other hand, if the ventilation opening is not sufficiently large for the number of fans in operation, the air may have an undesirably high entering velocity. Under such conditions, the fans may operate inefficiently or may be overloaded and damaged.

The ventilation control system of the present invention provides for automatically repositioning the curtains in accordance with the pressure differential created by the number of exhaust fans in operation. For clarity of illustration, the operating components of the ventilation control system are shown in FIGS. 1 to 3 as being located within an enclosure 30 on the outside of the confinement house. However, in actual practice it may be desirable for such components to be located inside the house. It will be readily appreciated by one of ordinary skill in the art that the particular position and arrangement of the ventilation control system may be varied to suit the particular structure and construction of the confinement house where it is installed.

Referring now more particularly to the ventilation control system as illustrated in FIG. 3, it will be seen that system includes, in addition to the exhaust fans previously described, a drive mechanism generally indicated at 40 connected to the cables of the flexible curtains to permit adjustably positioning the curtains, a pressure sensor 31, and a closure control system 50 for controlling the operation of the drive mechanism.

Figure 4:
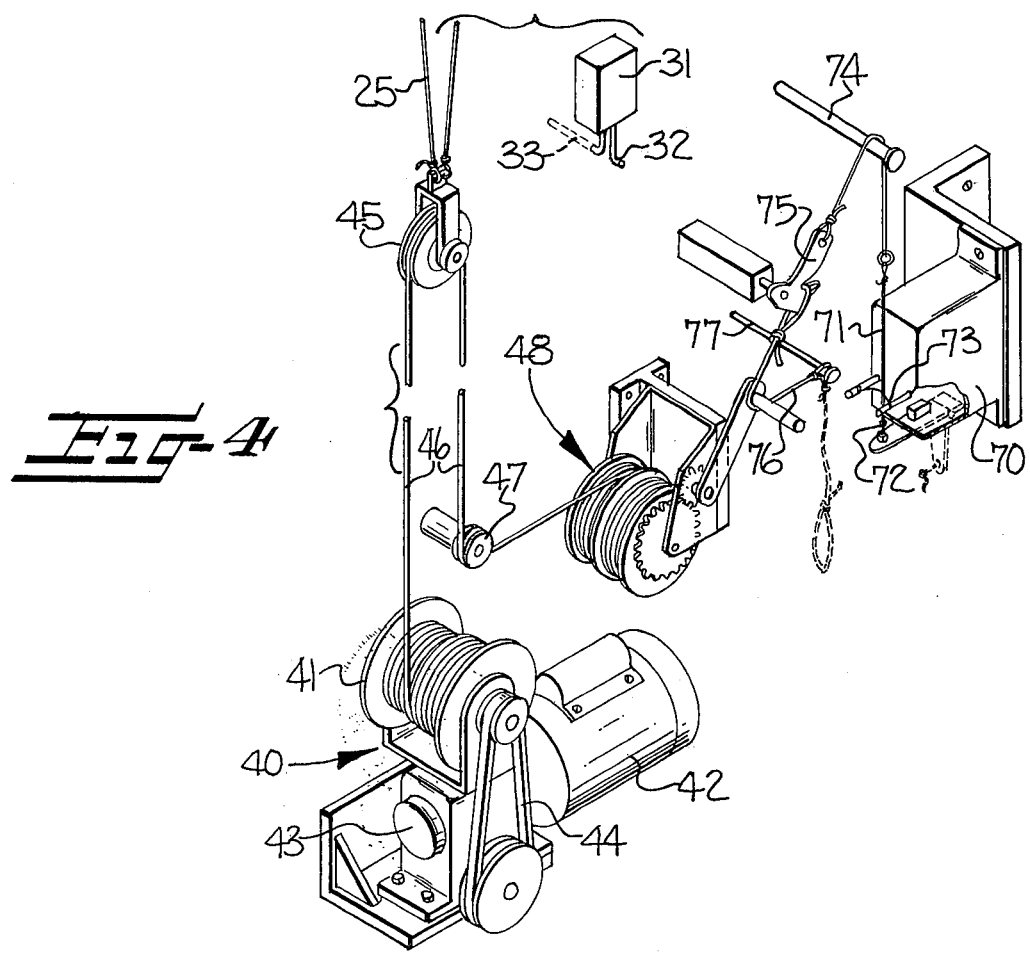
FIG. 4 is an enlarged perspective detailed view showing the arrangement of winches and cables employed for adjustment of the closures.

The drive mechanism 40 comprises a winch drum 41 driven by a reversible electric motor 42. As seen in FIG. 4, the output drive shaft of the motor is connected to a speed-reducing transmission 43 which, in turn, is connected through a belt type drive 44 to the winch drum 41. The main cable 25 for operating the curtains on opposite sides of the door terminates at a pulley 45. A draw cable 46 passes from the winch drum 41, through the pulley 45, around an idler pulley 47, and to a manual winch 48. Under normal operating conditions wherein the exhaust fans are employed to provide forced ventilation in the house, the flexible curtains will be maintained in a nearly closed position and will be adjusted by the electrically powered winch over a range of less than about a foot in order to maintain the desired level of inlet velocity. The manual winch 48 is used for manually repositioning the curtains, or for fully opening the same when desired.

Various types of devices may be employed for directly or indirectly measuring the pressure differential between the inside and outside of the confinement house. As illustrated herein, the pressure sensor 31 comprises a commercially available pressure differential switch such as the Dwyer Photohelic Pressure Switch/Gauge, manufactured by the FW Dwyer Manufacturing Company, Inc. This switch employs static tubes 32, 33 appropriately positioned inside and outside of the building to sense the respective inside and outside atmospheric pressures. The sensor 31 is connected to the control system 50, which in turn, is connected to the motor 42 so as to operate the motor in the direction necessary to open or close the curtains when the pressure differential fluctuates outside of a predetermined desired range. Thus for example, when the pressure differential sensed by the pressure sensor is too low for maintaining the desired inlet velocity, the motor 42 is operated in the direction necessary to close the curtains. When the sensed pressure differential is too high, as a result of additional exhaust fans coming into operation, the motor is operated in a direction which causes the curtain to be moved to a more open position.

Because of the cycling of the fans 17a and 17e, the pressure differential between the inside and outside of the house fluctuates each time the timer-controlled fans come in and out of operation. Additionally, momentary fluctuations in pressure occur as a result of gusts of wind or upon the opening of the door to the building. The control system 50 is designed to take into account these momentary disturbances and avoid unnecessarily adjusting the position of the curtains.

Figure 6:
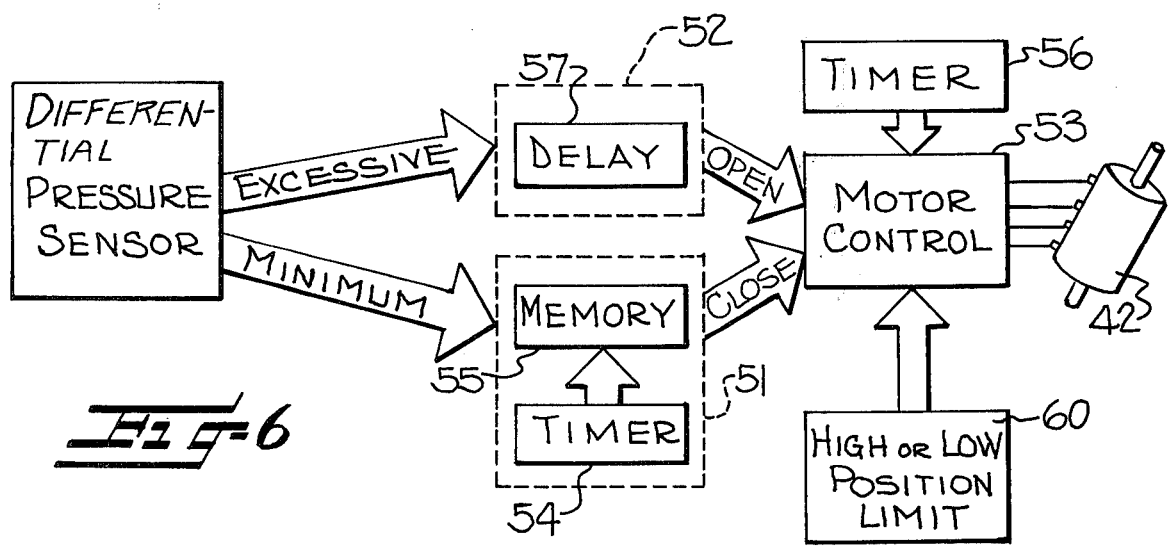
FIG. 6 is a schematic diagram of the electrical control system of the closure control device.

More particularly, as shown in FIG. 6, the control system 50 includes a curtain closing circuit 51 and a curtain opening circuit 52, both being operable in response to the pressure sensor 31. The control system also includes a motor control 53 connected to the closing and opening circuits 51, 52 and to the motor 42 and which controls the operation of the motor in the appropriate direction for opening or closing the curtains.

The curtain closing circuit 51 governs the closing of the curtains in such a manner that closing is effected only when the fans fail to achieve a predetermined minimum acceptable pressure differential sufficient to provide the minimum ventilation requirements in the house. However, fluctuations in pressure as a result of the stopping of the timer control fans do not bring about readjustment of the curtains.

This is accomplished by providing a timer 54 having a cycle of operation corresponding substantially to the cycle length of the fan cycle timer. A memory device 55, in conjunction with the timer 54, notes the sensing of the minimum acceptable pressure condition by pressure sensor 31 and determines whether such condition is achieved during each cycle of operation of the timer 54. Memory device 55 may comprise a conventional electro-mechanical relay or equivalent solid state device which is settable to one of two states. Occurrence of the minimum acceptable pressure differential sets the device from a first state to a second state. Periodically, under control of timer 54, the memory 55 is tested to determine the state thereof and then reset to the first state.

If the minimum pressure condition is achieved at least once during the cycle, then no readjustment of the curtain is effectuated. If the predetermined minimum acceptable pressure differential is not achieved during the cycle, then the output of the curtain closing circuit 51 directs the motor control 53 to bring motor 42 into operation in a direction to adjust the curtains to a more closed position. Thus it will be seen that the normal cycling of the timer-controlled fans and resultant fluctuations in pressure differential do not bring about a readjustment of the curtains and the curtains are readjusted only when the ventilation conditions remain below a predetermined minimum acceptable level for a period of time corresponding to the cycle of the timer-controlled fans.

The operation of the winch motor 42 is under control of a timer 56 which allows the motor 42 to operate for a preestablished length of time (e.g. 15 to 30 seconds) before stopping the motor. The timer is adjusted in accordance with the particular characteristics of the individual installation to allow the curtains to be adjusted for the approximate distance required to compensate for the pressure differential created by the operation of one fan. Thus, under most circumstances the curtains will be properly repositioned after one cycle of readjustment. Under some circumstances however, it may take several cycles for the curtains to be properly repositioned.

Alternatively, the motor 42 may be stopped in response to the pressure sensor 31 determining that the pressure differential has been brought back into an acceptable range. However, the use of a timer is preferred over this arrangement, as it provides more reliable operation in the event that a fan starts or stops during the time that the winch is in operation.

The curtain opening circuit 52 employs a delay timer 57 to negate the effects of momentary gusts of winds and the like. The delay timer may comprise a commercially available delay relay or equivalent solid state device which is set for a delay period of about 10 to 30 seconds. When an excessive pressure differential is sensed by the pressure sensor 31 and continues throughout the delay period, the output of the curtain opening circuit 52 directs the motor control 53 to operate the winch motor 42 in a direction to open the curtains and thereby bring about a reduction in the pressure differential. The motor operates until the pressure differential has been brought back into an acceptable range.

Figure 5:
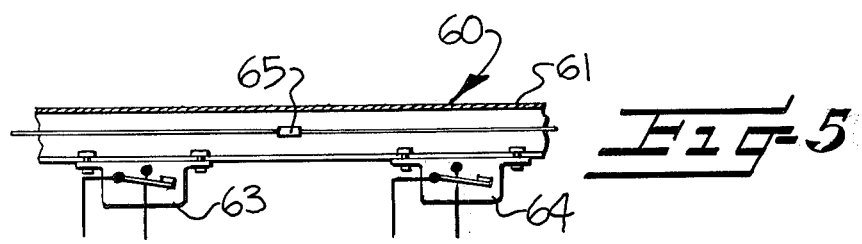
FIG. 5 is a detailed sectional view of the limit device for limiting the positioning of the closures.

Operation of the motor may also be stopped by a position limit switch 60 in the event that the curtains are adjusted too far in either direction. As shown in detail in FIG. 5, the position limit switch 60 comprises a tubular member 61 mounted to the wall of the house. A cable 62 has its opposite ends connected to main cable 25 and passes through the tubular member 61. A pair of magnetic reed switches 63 and 64 are connected to the tubular member 61 and are adapted for being adjustably positioned therealong. A permanent magnet 65 is connected to the cable 62 within the tubular member 61 and is so positioned that it passes alongside the switches 63 and 64 as the curtains are adjusted. When magnet 65 passes either one of the switches 63, 64, the switch contacts are closed, and motor control 53 causes the motor to be stopped.

To provide for adequate ventilation in the house in the event of a power failure or mechanical failure of the ventilating fans, the house may be provided with a curtain control device of the type disclosed and claimed in my earlier U.S. Pat. No. 3,915,377, issued Oct. 28, 1975. This device is adapted to effect full opening of the curtains in the event of a power failure or in the event that the temperature within the house exceeds a predetermined level.

FIG. 4 illustrates how the curtain control device may be used in conjunction with the present invention. As illustrated therein, the curtain control device 70 is mounted to the wall of the house alongside the manual winch 48. A heat fusible cord 71 is connected to an eye bolt 72 at the lower side of the control device and passes upwardly across an electrical resistance wire 73. The cord 71 passes over a suitably positioned support 74 and is connected to a pivoted release arm 75. Another cord 76 is tied to another support 77 and passes around the crank of the winch 48 and is connected to the pivoted release arm 75 to thereby hold the crank of winch 48 stationary.

Upon the occurrence of a power failure or abnormally high temperature condition within the house, the resistance wire 73 is heated, causing the cord 71 to be severed. This allows the pivot arm 75 to pivot and thereby releases the cord 76. The crank of the winch 48 is thus freed, releasing the curtains and allowing them to be lowered by their own weight to an open position. Details of the structure and operation of the curtain control device are contained in my aforementioned earlier U.S. Pat. No. 3,915,377 which is incorporated herein by reference.

In the drawings and specification, there has been set forth a preferred embodiment of the invention, and although specific terms are employed, they are used in a generic and descriptive sense only and not for purposes of limitation.

That which is claimed is:

1. A method of ventilating a confinement house of the type employed for rearing poultry and livestock and wherein there are ventilation openings in the walls of the house with adjustable closures for adjusting the effective size of the openings, said method comprising operating an exhaust fan for a relatively short period of time during each of a succession of predetermined intervals of longer duration to periodically draw outside air into the house through the ventilation openings, while sensing a differential in pressure between the inside and outside of the house as a result of operation of the exhaust fan, determining whether a predetermined minimum acceptable pressure differential is achieved during each such interval, and then following each such interval and in response to determining the failure of the exhaust fan in achieving a predetermined minimum acceptable pressure differential during such interval, effecting adjustment of the closures to a more closed position to bring about an increase in the pressure differential and a resulting increase in the velocity of the air drawn into the house to a desired level sufficient for effective ventilation of all areas of the house.

2. A method according to claim 1 comprising the additional step of effecting adjustment of the closures to a more open position in response to the sensing of an excessive pressure differential to thereby bring about a decrease in the pressure differential and a resulting decrease in the velocity of the air drawn into the house.

3. A method according to claim 2, wherein the step of effecting adjustment of the closures to a more open position is performed in response to the sensing of an excessive pressure differential for a predetermined length of time to thereby avoid adjusting the closures as a result of momentary fluctuations in the pressure differential.

4. A method of ventilating a confinement house of the type employed for rearing poultry and livestock and wherein there are ventilation openings in the walls of the house, adjustable closures cooperating with the openings for adjusting the effective size thereof, and an exhaust fan system operable to cause outside air to be drawn into the house through the ventilation openings, said method comprising operating the exhaust fan system at various capacities in accordance with the temperature conditions in the house to supply the needed level of ventilation in the house, while sensing a differential in pressure between the inside and outside of the house as a result of operation of the exhaust fan system, effecting an adjustment of the closures to a more open position in response to the sensing for a predetermined length of time of an excessive pressure differential to thereby bring about a decrease in the pressure differential and a resulting decrease in the velocity of the air drawn into the house, and periodically, at spaced intervals of time, and in response to the failure of the exhaust fan system in achieving a predetermined minimum acceptable pressure differential during any such interval of time, effecting adjustment of the closures to a more closed position to thereby bring about an increase in the pressure differential and a resulting increase in the velocity of the air drawn into the house to a level sufficient for effective ventilation of all areas of the confinement house.

5. In a confinement house of the type employed for rearing poultry and livestock and having ventilation openings in the walls thereof and adjustable closures cooperating with the ventilation openings for adjusting the effective size thereof, the combination therewith of a ventilation system for supplying a controlled flow of fresh air throughout the confinement house, said ventilation system comprising exhaust fan means operable to establish a pressure differential between the inside and outside of the confinement house for drawing a flow of outside air into the house through the ventilation openings, drive means connected to the adjustable closures for adjustably positioning the same, and closure control means for controlling the positioning of the adjustable closures by said drive means in accordance with the pressure differential achieved by said exhaust fan means so as to maintain the velocity of the air drawn into the confinement house through said ventilation openings at an optimum level for effective ventilation of all areas of the house, said closure control means comprising means for sensing the pressure differential between the inside and outside of the confinement house, and means cooperating with said sensing means and operable at predetermined spaced intervals of time, in response to the failure of said exhaust fan means in achieving a predetermined minimum acceptable pressure differential, for effecting adjustment of said closures to a more closed position to thereby bring about an increase in the pressure differential and a resulting increase in the air velocity drawn into the confinement house.

6. A ventilation system according to claim 5 wherein said exhaust fan means is operable at various operating capacities for drawing the flow of air into the confinement house at various volumetric flow rates, and wherein means is provided cooperating with said exhaust fan means for sensing the temperature conditions in the confinement house and for varying the operating capacity of the exhaust fan means in response thereto.

7. A ventilation system according to claim 5 wherein said exhaust fan means comprises a plurality of exhaust fans, timer means cooperating with certain of the exhaust fans for effecting cyclical operation thereof to supply the minimum ventilation requirements for the confinement house, and thermostat means cooperating with at least certain other of the fans for effecting operation thereof in response to increasing temperature conditions in the confinement house for thereby supplying increased levels of ventilation in the house when needed.

8. A ventilation system according to claim 5 wherein said closure control means also includes means cooperating with said sensing means and operable in response to the sensing of a predetermined excessive pressure differential for effecting adjustment of said closures to a more open position to thereby bring about a decrease in the pressure differential and a resulting decrease in the air velocity drawn into the confinement house.

9. A ventilation system according to claim 8 additionally including position limit means cooperating with said closures and with said drive means and being operable for stopping said drive means in response to the closures being adjusted beyond predetermined limits.

10. In a confinement house of the type employed for rearing poultry and livestock and having ventilation openings in the walls thereof and adjustable closures cooperating with the ventilation openings for adjusting the effective size thereof, the combination therewith of a ventilation system for supplying a controlled flow of fresh air throughout the confinement house, said ventilation system comprising exhaust fan means operable to establish a pressure differential between the inside and outside of the confinement house for drawing a flow of outside air into the house through the ventilation openings, drive means connected to the adjustable closures for adjustably positioning the same, and closure control means for controlling the positioning of the adjustable closures by said drive means in accordance with the pressure differential achieved by said exhaust fan means so as to maintain the velocity of the air drawn into the confinement house through the ventilation openings at an optimum level for effective ventilation of all areas of the house, said closure control means comprising means for sensing the differential in pressure between the inside and outside of the confinement house, means associated with said sensing means for determining whether a predetermined minimum acceptable pressure differential is sensed during each one of a succession of predetermined length measurement periods, and means associated with said drive means and operable in response to the failure of the minimum acceptable pressure differential being sensed during any such measurement period for effecting adjustment of the closures to a more closed position to thereby bring about an increase in the pressure differential and a resulting increase in the air velocity drawn into the confinement house.

11. A ventilation system according to claim 10 wherein said exhaust fan means comprises a plurality of exhaust fans, timer means cooperating with certain of the exhaust fans for effecting cyclical operation thereof to supply the minimum ventilation requirements for the confinement house, and thermostat means cooperating with at least certain other of the fans for effecting operation thereof in response to increasing temperature conditions in the confinement house for thereby supplying increased levels of ventilation in the house when needed.

12. A ventilation system according to claim 11 wherein said timer means cooperating with certain of the exhaust fans is operable for effecting operation of the fans for relatively short periods of time and at regular intervals, and wherein said measurement periods substantially correspond in length to said regular intervals of operation of the exhaust fans.

13. A ventilation system according to claim 10 wherein said closure control means also comprises means for determining whether a predetermined excessive pressure differential is achieved, and in response to such excessive pressure differential being achieved and maintained for a predetermined period of time, being operable for effecting opening of said closures to thereby bring about a decrease in the pressure differential and a resulting decrease in the air velocity drawn into the confinement house.

14. A ventilation system according to claim 10 additionally including means connected to the adjustable closures and being operable in response to the failure of the power supply to said exhaust fan means for effecting opening of the adjustable closures to thereby insure adequate natural ventilation of the confinement house in the event of a power failure to prevent suffocation of the poultry or livestock housed therein.

15. A ventilation system according to claim 10 additionally including means connected to the adjustable closures and being operable in response to predetermined extreme high temperature conditions for effecting opening of the adjustable closures to thereby insure adequate natural ventilation of the confinement house to prevent suffocation of the poultry or livestock housed therein.

16. In a confinement house of the type employed for rearing poultry and livestock and having ventilation openings in the walls thereof and adjustable closures cooperating with the ventilation openings for adjusting the effective size thereof, the combination therewith of a ventilation system for supplying a controlled flow of fresh air throughout the confinement house, said ventilation system comprising a plurality of exhaust fans operable to establish a pressure differential between the inside and outside of the confinement house for drawing a flow of outside air into the house through the ventilation openings, timer means cooperating with certain of said exhaust fans for effecting cyclical operation thereof in regular cycles and for relatively short duration during predetermined normal temperature conditions in the confinement house to supply the minimum ventilation requirements for the house, thermostat means cooperating with at least certain other of the fans for effecting operation thereof during predetermined elevated temperature conditions in the confinement house for thereby supplying increased levels of ventilation in the house when needed, drive means connected to the adjustable closures for adjustably positioning the same, and closure control means for controlling the positioning of the adjustable closures by said drive means so as to maintain the velocity of the air drawn into the confinement house through the ventilation openings at an optimum level for effective ventilation of all areas of the house regardless of the number of exhaust fans in operation at a particular time, said closure control means including minimum condition responsive means for sensing the occurrence of a predetermined minimum acceptable differential in pressure between the inside and outside of the confinement house, and means associated with said minimum condition responsive means and operable in response to the failure of said predetermined minimum acceptable pressure differential being achieved as a result of operation of one or more of said exhaust fans for effecting adjustment of the closures to a more closed position to thereby bring about an increase in the pressure differential and a resulting increase in the air velocity drawn into the house through the ventilation openings.

17. A ventilation system according to claim 16 wherein said closure control means additionally includes maximum condition responsive means for sensing the occurrence of a predetermined excessive differential in pressure between the inside and outside of the confinement house, and means cooperating with said drive means and with said maximum condition responsive means and operable in response to the sensing of said excessive pressure differential for a predetermined period of time to effect operation of said drive means to adjust the closures to a more open position.

* * * * *